Patented Oct. 10, 1933

1,930,351

UNITED STATES PATENT OFFICE 1,930,351

PROCESS OF PREPARING 1.4-DIAMINOAN-THRAQUINONE

Curt Bamberger, Wuppertal-Elberfeld, and Paul Nawiasky, Ludwigshafen, Germany, assignors to General Aniline Works, Inc., New York, N. Y., a corporation of Delaware No Drawing. Application October 20, 1931, Serial No. 570,044, and in Germany October 20, 1930

8 Claims. (Cl. 260—60)

The present invention relates to a process of preparing 1.4-diaminoanthraquinone and to the new intermediate product obtainable in said process.

The British specification No. 15 355/08 (Example 1), describes among others a "leuco derivative" of 1.4-diaminoanthraquinone, which is obtained by heating quinizarine with ammonia and sodium hydro-sulfite under superatmospheric pressure. Detailed investigations have shown that this substance is not a true leuco compound, since it is stable to air and does not form immediately a readily oxidizable vat with cold caustic soda solution. The substance belongs rather to the class of reduction products designated as "hydro compounds" in the British specification No. 274 558.

The substance described in British specification No. 15 355/08 is, therefore, to be designated as hydro-1.4-diaminoanthraquinone or 1.4-diamino-2.3-dihydro-anthraquinone and must be formulated most probably as follows:

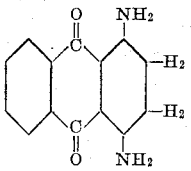

When this 1.4-diamino-2.3-dihydro-anthraquinone, dissolved in concentrated sulfuric acid, is caused to react with, for example, one molecule of pyrolusite at room temperature, the pyrolusite is consumed very quickly. There is produced, however, not as might be expected 1,4-diaminoanthraquinone, but a substance of a type, which was hitherto quite unknown in the anthraquinone series, most probably 1.4-diimino-2.3-dihydroanthraquinone:—

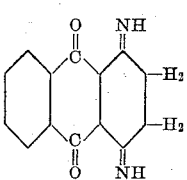

The constitution of this substance is indicated by the fact that on treatment with reducing agents, such as sulfurous acid, it is converted into 1.4-diamino-2.3-dihydro-anthraquinone. On the other hand the action of water yields in accordance with the following equation:—

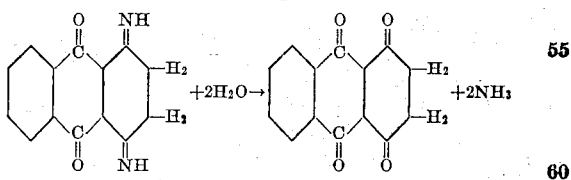

a new substance free from nitrogen, of a quinoid character, and which is reduced by sulfurous acid to hydroquinizarine (1.4-dihydroxy-2.3-dihydro-anthraquinone).

The oxidation of the 1.4-diamino-2.3-dihydro-anthraquinone to 1.4-diimino-2.3-dihydro-anthraquinone is performed, as mentioned above, in sulfuric acid solution.

Sulfuric acids of various concentrations may be applied, however, it will be of advantage to apply a sulfuric acid of a strength not below about 50 to 55%. As oxidizing agents those may be used, as possess an oxidizing action in sulfuric acid solution, such as halogens (chlorine or bromine, for example), manganese dioxide, lead dioxide, persulfates, chromic acid, potassium ferric cyanide etc. Generally we prefer to apply the oxidizing agent in about the amount theoretically necessary to oxidize the 1.4-diamino-2.3-dihydro-anthraquinone to 1.4-diimino-2.3-dihydro-anthraquinone. An excess of the oxidizing agent is not obnoxious, when working in a sulfuric acid of above about 85% strength, whereas in case of using a sulfuric acid of lower concentration, an excess of the oxidizing agent is to be strictly avoided, since otherwise another reaction occurs. It is, therefore, of advantage, to work with slightly less than the theoretical quantity of the oxidizing agent in all cases, in which a sulfuric acid of below about 85% strength is applied.

The temperature at which oxidation of the 1.4-diamino-2.3-dihydro-anthraquinone to 1.4-diimino-2.3-dihydro-anthraquinone occurs may vary in wide limits. If it is intended to isolate the 1.4-diimino-2.3-dihydro-anthraquinone, it is advisable to apply rather low temperatures, say about 0° C. or less up to about room temperature. Higher temperatures up to about 100° C. will be operable in case a strong sulfuric acid, for example, monohydrate is used.

The 1.4-diimino-2.3-dihydro-anthraquinone can be isolated in the solid state in the form of the sulfate, when the oxidation melt is poured into 15 times the quantity of a mixture of ice and water, whereupon from the at first colorless clear solution the sulfate of the diimino-2.3-dihydro-anthraquinone separates in colorless clusters of needles. The substance is, however, rather unstable. For its further working up to 1.4-diaminoanthraquinone isolation is unnecessary.

When treating 1.4-diimino-2.3-dihydroanthraquinone in sulfuric acid of about 50–100% strength, rearrangement of the same to 1.4-diaminoanthraquinone occurs according to the probable equation:—

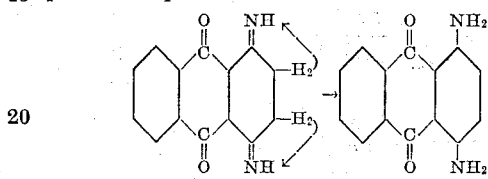

When, for example, the oxidation melt obtainable by the reaction of 1.4-diamino-2.3-dihydro-anthraquinone with one molecule of pyrolusite or another oxidizing agent of the type specified in 90–100% sulfuric acid is heated to 90–100° C. or more, a smooth rearrangement of the 1.4-diimino-2.3-dihydro-anthraquinone into 1.4-diaminoanthraquinone occurs. The latter substance can thus be produced from the readily accessible 1.4-diamino-2.3-dihydro-anthraquinone in a convenient manner and in a very satisfactory state of purity.

The rearrangement can also be effected in more dilute sulfuric acid, in which case it proceeds at a considerably lower temperature. Using an acid of 65%, for example, the rearrangement takes place on prolonged standing at room temperature, with a stronger sulfuric acid, for example with monohydrate, it proceeds at 100° C. considerably more slowly than with sulfuric acid of 96%. The lower limit, at which a smooth rearrangement occurs, lies at a sulfuric acid concentration of 50–55% and at a temperature of about 10–15° C.

From the above it results that the temperature to be applied in the rearrangement process must be adapted to the strength of the sulfuric acid applied. The lower the concentration of the sulfuric acid, the lower the temperature at which rearrangement occurs.

Instead of oxidizing at a low temperature and then effecting the rearrangement at a higher temperature the oxidation can be carried out directly at the temperature at which the sulfuric acid in question brings about the rearrangement. Temperatures up to about 100–120° C. will be operable in these cases.

The following examples will illustrate the invention, without, however, restricting it thereto, the parts being by weight:—

*Example 1*

2,40 parts of 1.4-diamino-2.3-dihydro-anthraquinone are dissolved in 50 parts of 90% sulfuric acid. To the solution 1,25 parts of synthetic pyrolusite, containing 67% $MnO_2$ (that is 96% of the calculated quantity) suspended in 25 parts of 90% sulfuric acid are added while stirring, the temperature being maintained between 10 and 15° C. The greenish-yellow coloration of the sulfuric acid solution thereupon changes to a powerful orange. When all the pyrolusite has entered into the reaction, a test portion poured into water containing sulfurous acid gives an intense yellow solution of the 1.4-diamino-2.3-dihydro-anthraquinone regenerated by reduction. The solution is then heated to 90–95° C., whereupon the rearrangement proceeds to completion in a short time, which can be recognized by the fact that a test portion poured into water containing sulfurous acid yields a dark violet precipitate of 1.4-diaminoanthraquinone, the filtrate of which is no longer yellow in color. The melt is then cooled and 33 parts of water are stirred in at a temperature, which is not allowed to exceed 50° C. Colorless needles of 1.4-diaminoanthraquinone sulfate separate, of which the quantity further increases on cooling and standing. The sulfate which has separated is filtered with suction and decomposed by means of water. Thus is obtained 80–85% of the theoretical yield of very pure 1.4-diaminoanthraquinone.

*Example 2*

On replacing the 90% sulfuric acid used in Example 1 by the same quantity of a 65% sulfuric acid, oxidizing at 5–10° C. and then slowly allowing the temperature to rise to about 20° C., beautiful colorless crystals of 1.4-diaminoanthraquinone sulfate soon separate. When the quantity thereof no longer increases, the crystals are isolated as described in Example 1.

*Example 3*

2.40 parts of 1.4-diamino-2.3-dihydro-anthraquinone are dissolved in 60 parts of 96% sulfuric acid. The solution is then heated to 90–95° C. and 1,25 parts of 67% pyrolusite, suspended in 20 parts of 96% sulfuric acid are added slowly at this temperature. When unchanged 1.4-diamino-2.3-dihydro-anthraquinone can no longer be detected, the melt is diluted to 63% sulfuric acid by stirring in water, whereupon the 1.4-diaminoanthraquinone sulfate crystallizes out. Alternatively the melt is poured into 1500 parts of water and the diaminoanthraquinone, which separates, is filtered.

The pyrolusite used in the above examples can be replaced by other oxidizing agents, such as for example, halogens, (chlorine or bromine), $PbO_2$, persulfates, potassium ferric cyanide, chromic acid, etc.

*Example 4*

10 parts of 1.4-diamino-2.3-dihydro-anthraquinone are dissolved in 40 parts of monohydrate, the solution is heated to 100–110° C. and at this temperature chlorine is passed in while stirring thoroughly, until practically no 1.4-diamino-2.3-dihydro-anthraquinone can be further detected. This is recognized, for example, by the fact that a test portion neutralized with sodium carbonate gives the same coloration in solution in acetone as 1.4-diaminoanthraquinone. The solution is then left to cool, poured into cold water and the product filtered, washed until neutral and dried. The yield is quantitative.

By crystallization of the crude product from trichlorobenzene a practically pure 1.4-diaminoanthraquinone is obtained without much loss.

Instead of monohydrate more dilute sulfuric acid, such as for example, 96% acid can be used.

*Example 5*

10 parts of 1.4-diamino-2.3-dihydro-anthraquinone are dissolved in 40 parts of 96% sulfuric acid and the mixture is heated to 100–110° C. At this temperature sulfuryl chloride is added in small portions under the reflux condenser, until the starting material has completely disappeared. Thereupon the whole is poured into water, filtered by suction and washed neutral.

*Example 6*

10 parts of 1.4-diamino-2.3-dihydro-anthraquinone are dissolved in 40 parts of 96% sulfuric acid and the solution is heated to 100–110° C. At this temperature a stream of air, which has been charged with bromine by previously passing through a washing bottle filled with bromine, is introduced into the mixture, until the starting material cannot be detected any more. Thereafter the whole is poured into water, filtered by suction and washed neutral.

We claim:—

1. In the process of preparing 1.4-diaminoanthraquinone the step which comprises reacting upon 1.4-diamino-2.3-dihydro-anthraquinone dissolved in sulfuric acid of about 50–100% strength with an oxidizing agent possessing oxidizing properties in sulfuric acid solution, at a temperature not exceeding that, at which rearrangement of the 1.4-diimino-2.3-dihydro-anthraquinone being formed occurs, the oxidizing agent being applied in an amount corresponding to not more than the theoretical quantity necessary to oxidize 1.4-diamino-2.3-dihydro-anthraquinone to 1.4-diimino-2.3-dihydroxy-anthraquinone.

2. In the process of preparing 1.4-diaminoanthraquinone the step which comprises reacting upon 1.4-diamino-2.3-dihydro-anthraquinone dissolved in sulfuric acid of about 50–100% strength with manganese dioxide at a temperature not exceeding that at which rearrangement of the 1.4-diimino-2.3-dihydro-anthraquinone being formed occurs, the oxidizing agent being applied in an amount corresponding to not more than the theoretical quantity necessary to oxidize 1.4-diamino-2.3-dihydro-anthraquinone to 1.4-diimino-2.3-dihydro-anthraquinone.

3. As a new product the compound of the probable formula:—

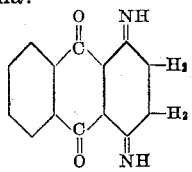

said compound forming in form of its sulfate colorless needles, yielding 1.4-diamino-2.3-dihydro-anthraquinone with sulfurous acid, hydroquinizarinequinone with water and 1.4-diaminoanthraquinone, when rearranged with sulfuric acid above about 50% strength.

4. In the process of preparing 1.4-diaminoanthraquinone the step which comprises dissolving 1.4-diimino-2.3-dihydro-anthraquinone in sulfuric acid of about 50–100% strength and heating the reaction mixture to a temperature sufficient to cause rearrangement of the 1.4-diimino-2.3-dihydro-anthraquinone to 1.4-diaminoanthraquinone.

5. Process which comprises treating 1.4-diamino-2.3-dihydro-anthraquinone dissolved in sulfuric acid of about 50–100% strength with an oxidizing agent possessing oxidizing properties in sulfuric acid solution in an amount corresponding to not more than that which is theoretically necessary to transform 1.4-diamino-2.3-dihydro-anthraquinone into 1.4-diimino-2.3-dihydro-anthraquinone at a temperature sufficient to rearrange the 1.4-diimino-2.3-dihydro-anthraquinone being firstly formed into 1.4-diaminoanthraquinone, whereby in the oxidation step of the process substantially lower temperatures may likewise be applied.

6. Process which comprises treating one molecular weight of 1.4-diamino-2.3-dihydro-anthraquinone dissolved in sulfuric acid of about 50–100% strength with not more than one molecular weight of manganese dioxide at a temperature sufficient to rearrange the 1.4-diimino-2.3-dihydro-anthraquinone being firstly formed into 1.4-diaminoanthraquinone, whereby in the oxidation step of the process substantially lower temperatures may likewise be applied.

7. Process which comprises reacting upon one molecular weight of 1.4-diamino-2.3-dihydro-anthraquinone with one molecular weight of manganese dioxide in sulfuric acid solution of about 90–100% strength at about room temperature and heating the reaction mixture, after oxidation is complete, to a temperature of about 100–110° C. until the 1.4-diimino-2.3-dihydro-anthraquinone has disappeared.

8. Process which comprises reacting upon 1.4-diamino-2.3-dihydro-anthraquinone dissolved in sulfuric acid of about 90–100% strength with chlorine at a temperature of about 100–110° C. until no 1.4-diamino-2.3-dihydro-anthraquinone can be further detected.

CURT BAMBERGER.
PAUL NAWIASKY.